(12) United States Patent
Slutsky et al.

(10) Patent No.: US 10,605,924 B2
(45) Date of Patent: Mar. 31, 2020

(54) METHOD AND APPARATUS CROSS SEGMENT DETECTION IN A LIDAR SYSTEM

(71) Applicant: GM GLOBAL TECHNOLOGY OPERATIONS LLC, Detroit, MI (US)

(72) Inventors: Michael Slutsky, Kfar Saba (IL); Ariel Lipson, Tel Aviv (IL); Itai Afek, Kfar Sava (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 489 days.

(21) Appl. No.: 15/667,062

(22) Filed: Aug. 2, 2017

(65) Prior Publication Data

US 2019/0041522 A1    Feb. 7, 2019

(51) Int. Cl.
| | |
|---|---|
| *G01S 17/00* | (2020.01) |
| *G01S 17/931* | (2020.01) |
| *G01S 17/89* | (2020.01) |
| *G01S 7/481* | (2006.01) |
| *G01S 17/26* | (2020.01) |
| *G01S 17/86* | (2020.01) |

(52) U.S. Cl.
CPC ......... *G01S 17/931* (2020.01); *G01S 7/4815* (2013.01); *G01S 7/4816* (2013.01); *G01S 17/26* (2020.01); *G01S 17/86* (2020.01); *G01S 17/89* (2013.01)

(58) Field of Classification Search
USPC ...................................................... 356/4.01
See application file for complete search history.

(56) References Cited

U.S. PATENT DOCUMENTS

| | | | | |
|---|---|---|---|---|
| 2005/0231710 A1* | 10/2005 | Jamieson | ............... | G01C 5/005 356/28 |
| 2006/0227318 A1* | 10/2006 | Jamieson | ............... | G01C 5/005 356/28.5 |
| 2007/0276599 A1* | 11/2007 | Ogawa | ................. | G06K 9/4604 382/181 |
| 2010/0019964 A1* | 1/2010 | Huang | .................. | G01M 17/06 342/357.31 |
| 2010/0098295 A1* | 4/2010 | Zhang | ................ | G06K 9/00798 382/103 |
| 2012/0038903 A1* | 2/2012 | Weimer | .................... | G01C 3/08 356/4.07 |
| 2012/0130598 A1* | 5/2012 | Hukkeri | ................ | G01S 7/4815 701/49 |
| 2013/0100438 A1* | 4/2013 | Breuer | .................... | G01P 13/00 356/51 |
| 2013/0201560 A1* | 8/2013 | Dueck | .................... | H01S 3/0071 359/569 |
| 2013/0211672 A1* | 8/2013 | Roehder | ................ | G06F 17/00 701/36 |
| 2013/0321800 A1* | 12/2013 | Margalit | .................. | G01J 3/44 356/301 |

(Continued)

*Primary Examiner* — James R Hulka
(74) *Attorney, Agent, or Firm* — Lorenz & Kopf, LLP

(57) ABSTRACT

The present application generally relates communications and hazard avoidance within a monitored driving environment. More specifically, the application teaches a system for improved target object detection in a vehicle equipped with a laser detection and ranging LIDAR system by simultaneously transmitting multiple lasers in an array and resolving angular ambiguities using a plurality of horizontal detectors and a plurality of vertical detectors.

20 Claims, 7 Drawing Sheets

(56) References Cited

U.S. PATENT DOCUMENTS

| | | | | |
|---|---|---|---|---|
| 2014/0078516 | A1* | 3/2014 | Hirai | G06F 3/0421 356/614 |
| 2014/0347648 | A1* | 11/2014 | Roberts | G01S 17/06 356/4.01 |
| 2014/0350836 | A1* | 11/2014 | Stettner | G01S 7/481 701/301 |
| 2015/0219764 | A1* | 8/2015 | Lipson | H01S 5/00 356/4.01 |
| 2015/0258990 | A1* | 9/2015 | Stettner | B60W 30/08 701/37 |
| 2016/0003946 | A1* | 1/2016 | Gilliland | G01S 17/10 356/5.01 |
| 2016/0178802 | A1* | 6/2016 | Stainvas Olshansky | G01S 17/95 356/341 |
| 2016/0327635 | A1* | 11/2016 | Scheim | G01S 17/42 |
| 2016/0327636 | A1* | 11/2016 | Gazit | G01S 17/936 |
| 2016/0327637 | A1* | 11/2016 | Gazit | G01S 17/10 |
| 2016/0327646 | A1* | 11/2016 | Scheim | G01S 17/102 |
| 2016/0327648 | A1* | 11/2016 | Lipson | G01S 17/88 |
| 2017/0350982 | A1* | 12/2017 | Lipson | G02B 5/20 |
| 2018/0058923 | A1* | 3/2018 | Lipson | G01J 1/0437 |
| 2018/0306927 | A1* | 10/2018 | Slutsky | G01S 17/10 |
| 2018/0373253 | A1* | 12/2018 | Lipson | G08G 1/165 |
| 2018/0373260 | A1* | 12/2018 | Lipson | G05D 1/0231 |
| 2019/0033460 | A1* | 1/2019 | Lipson | G01S 7/4816 |
| 2019/0041865 | A1* | 2/2019 | Lipson | G05D 1/0231 |
| 2019/0086513 | A1* | 3/2019 | Lipson | G01S 7/4815 |

* cited by examiner

METHOD AND APPARATUS CROSS SEGMENT DETECTION IN A LIDAR SYSTEM

BACKGROUND

The present application generally relates to autonomous and semiautonomous vehicles. More specifically, the application teaches an apparatus for improved target object detection in a vehicle equipped with a laser detection and ranging LIDAR system.

BACKGROUND INFORMATION

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems, such as cruise control, adaptive cruise control, and parking assistance systems correspond to lower automation levels, while true "driverless" vehicles correspond to higher automation levels.

Increasingly, vehicles being equipped to determine the environment around them autonomously or semiautonomous using onboard sensors. A valuable sensor for this task is LIDAR, which is a surveying technology that measures distance by illuminating a target with a laser light. However, fixed LiDAR systems typically require a laser for each point in a field of view, thereby requiring a large number of lasers in order to achieve a dense point cloud at a distance. It would be desirable to achieve a greater density point cloud while limiting the number of laser transmitters.

SUMMARY

Embodiments according to the present disclosure provide a number of advantages. For example, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

In accordance with an aspect of the present invention, an apparatus comprising a laser emitting device for emitting a laser in a first direction, a first detector having a first detection portion for detecting a first laser intensity and a second detection portion for detecting a second laser intensity, wherein the first detection portion and the second detection portion are oriented in a first direction, the first detector further operative to generate a first control signal in response to the detection of the first laser intensity and the second laser intensity, a second detector having a third detection portion for detecting a third laser intensity and a fourth detection portion for detecting a fourth laser intensity, wherein the third detection portion and the fourth detection portion are oriented in a second direction wherein the second direction is orthogonal to the first direction, the second detector further operative to generate a second control signal in response to the detection of the third laser intensity and the fourth laser intensity, a first lens for distributing a first laser refection over a subsection of the first detection portion and the second detection portion, a second lens for distributing a second laser refection over a subsection of the third detection portion and the fourth detection portion, and a processor for determining a transmitter of origin in response to the first control signal and the second control signal.

In accordance with another aspect of the present invention, a LiDAR system comprising a transmitter for transmitting a light pulse, a first detector having a first detection portion and a second detection portion, the first detection portion and the second detection portion having a first orientation, a second detector having a third detection portion and a fourth detection portion, the third detection portion and the fourth detection portion having a second orientation, wherein the second orientation is orthogonal to the first orientation, and a processor for determining a location of the transmitter in response to a first ratio of the light pulse detected by the first detection portion and the second detection portion and a second ratio of the light pulse detected by the third detection portion and the fourth detection portion.

In accordance with another aspect of the present invention, a VCSEL array having a first transmitter for transmitting a first light pulse and a second transmitter for transmitting a second light pulse, a first detector array having a first vertical detector for receiving a first portion of the first light pulse and a second vertical detector for receiving a first portion of the second light pulse, the first detector further operative to generate a first control signal in response to the first portion of the first light pulse and the first portion of the second light pulse, a second detector array having a first horizontal detector for receiving a second portion of the first light pulse and a second horizontal detector for receiving a second portion of the second light pulse, the second detector further operative to generate a second control signal in response to the second portion of the first light pulse and the second portion of the second light pulse, and a processor for determining a location of an object in response to the first control signal and the second control signal.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
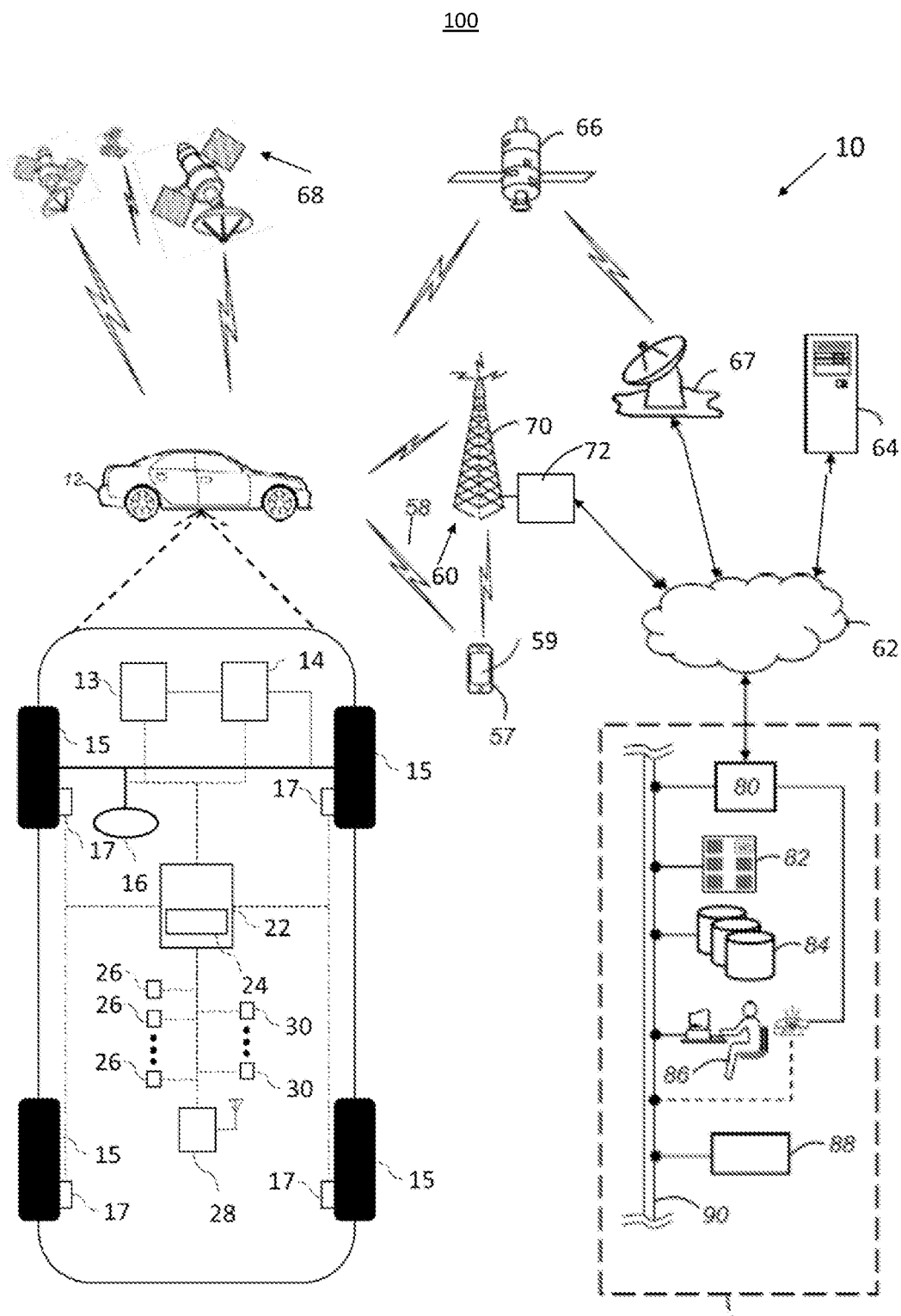
FIG. 1 is a schematic diagram of a communication system including an autonomously controlled vehicle, according to an embodiment.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. For example, the LiDAR sensor of the present invention has particular application for use on a vehicle. However, as will be appreciated by those skilled in the art, the LiDAR sensor of the invention may have other applications.

Modern vehicles sometimes include various active safety and control systems, such as collision avoidance systems, adaptive cruise control systems, lane keeping systems, lane centering systems, etc., where vehicle technology is moving towards semi-autonomous and fully autonomous driven vehicles. For example, collision avoidance systems are known in the art that provide automatic vehicle control, such as braking, if a potential or imminent collision with another vehicle or object is detected, and also may provide a warning to allow the driver to take corrective measures to prevent the collision. Also, adaptive cruise control systems are known that employ a forward looking sensor that provides automatic speed control and/or braking if the subject vehicle is approaching another vehicle. The object detection sensors for these types of systems may use any of a number of technologies, such as short range radar, long range radar, cameras with image processing, laser or LiDAR, ultrasound, etc. The object detection sensors detect vehicles and other objects in the path of a subject vehicle, and the application software uses the object detection information to provide warnings or take actions as appropriate.

LiDAR sensors are sometimes employed on vehicles to detect objects around the vehicle and provide a range to and orientation of those objects using reflections from the objects providing multiple scan points that combine as a point cluster range map, where a separate scan point is provided for every ½° or less across the field-of-view (FOV) of the sensor. Therefore, if a target vehicle or other object is detected in front of the subject vehicle, there may be multiple scan points that are returned that identify the distance of the target vehicle from the subject vehicle. By providing a cluster of scan return points, objects having various and arbitrary shapes, such as trucks, trailers, bicycle, pedestrian, guard rail, etc., can be more readily detected, where the bigger and/or closer the object to the subject vehicle the more scan points are provided.

Most known LiDAR sensors employ a single laser and a fast rotating mirror to produce a three-dimensional point cloud of reflections or returns surrounding the vehicle. As the mirror rotates, the laser emits pulses of light and the sensor measures the time that it takes the light pulse to be reflected and returned from objects in its FOV to determine the distance of the objects, known in the art as time-of-flight calculations. By pulsing the laser very quickly, a three-dimensional image of objects in the FOV of the sensor can be generated. Multiple sensors can be provided and the images therefrom can be correlated to generate a three-dimensional image of objects surrounding the vehicle.

One disadvantage of most know LiDAR sensors is finite angular grid resolution. The LiDAR is operative to pulse the laser at discrete angles around the vehicle. For example, if the laser is pulsed with an angular resolution of 0.5 degrees, at 50 meters, the cross range spacing of the field of view is approximately 0.5 meters. For a LiDAR used in an autonomous vehicle application, a target vehicle may only reflect one or two of the transmitted laser pulses. A few number of hits of a target object at a large distance may provide insufficient information of object boundaries. It would be desirable to estimate the surface length and angle orientation of each hit point and to recover additional object information.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device 57 including but not limited to a smart phone, tablet, or wearable device such as a watch, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the networked wireless device 57. The networked wireless device 57 can include computer processing capability, a transceiver capable of communicating using a short-range wireless protocol, and a visual display 59. The computer processing capability includes a microprocessor in the form of a programmable device that includes one or more instructions stored in an internal memory structure and applied to receive binary input to create binary output. In some embodiments, the networked wireless device 57 includes a GPS module capable of receiving GPS satellite signals and generating GPS coordinates based on those signals. In other embodiments, the networked wireless device 57 includes cellular communications functionality such that the networked wireless device 57 carries out voice and/or data communications over the wireless carrier system 60 using one or more cellular communications protocols, as are discussed herein. The visual display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the networked wireless device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

The remote access center 78 is designed to provide the wireless communications system 28 of the vehicle 12 with a number of different system functions and, according to the exemplary embodiment shown in FIG. 1, generally includes one or more switches 80, servers 82, databases 84, live advisors 86, as well as an automated voice response system (VRS) 88. These various remote access center components are preferably coupled to one another via a wired or wireless local area network 90. The switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and the network 90. Data transmissions are passed via the modem to the server 82 and/or the database 84. The database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote access center 78 using the live advisor 86, it will be appreciated that the remote access center can instead utilize the VRS 88 as an automated advisor, or a combination of the VRS 88 and the live advisor 86 can be used.

Figure 2:
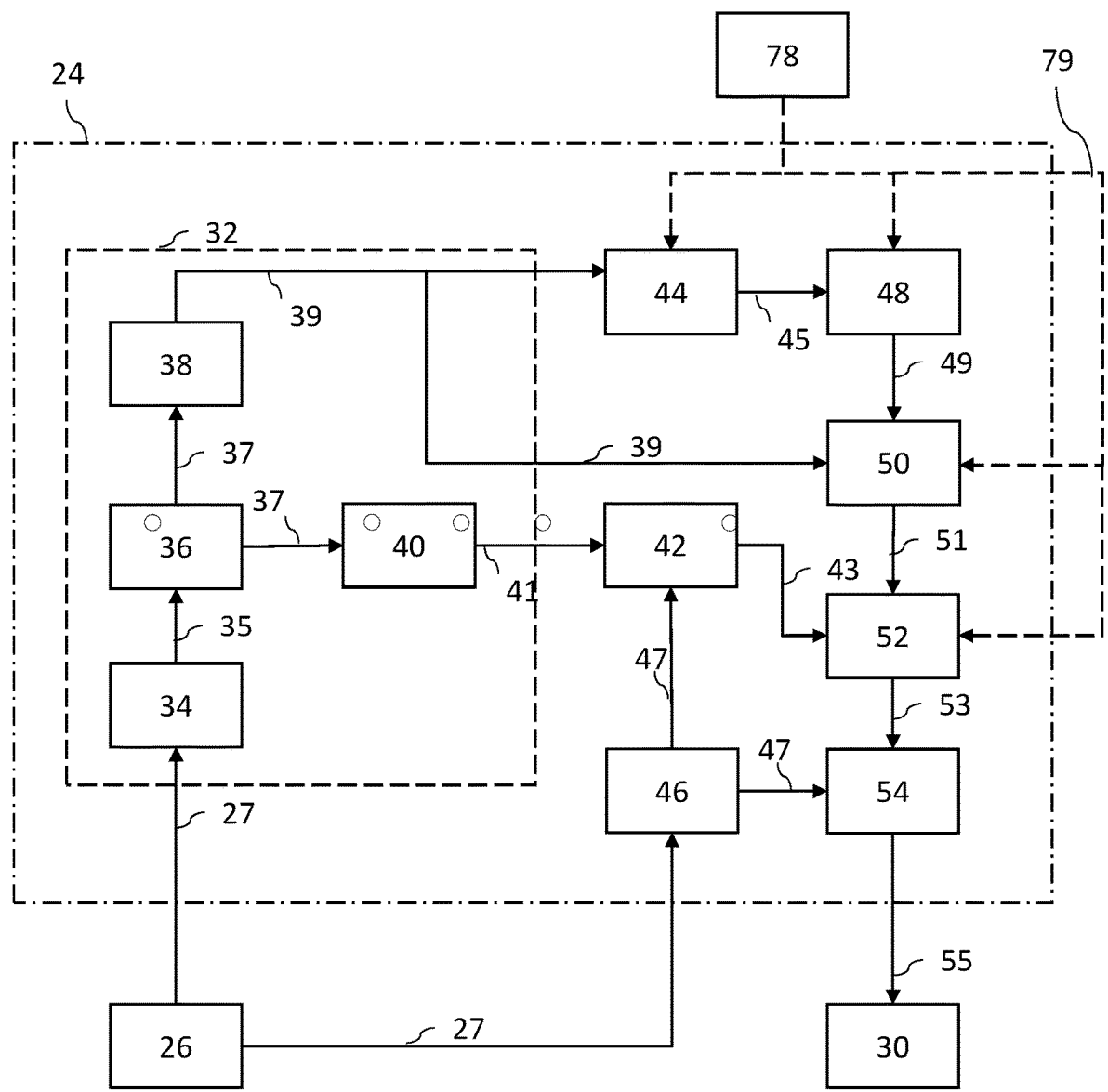
FIG. 2 is a schematic block diagram of an automated driving system (ADS) for a vehicle, according to an embodiment.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks.

The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of construction zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation.

In some embodiments, the localization and mapping module 40 uses SLAM techniques to develop maps of the surrounding environment. SLAM is an acronym for Simultaneous Localization and Mapping. SLAM techniques construct a map of an environment and track an object's position within the environment. GraphSLAM, a variant of SLAM, employs sparse matrices which are used to produce a graph containing observation interdependencies.

Object position within a map is represented by a Gaussian probability distribution centered around the object's predicted path. SLAM in its simplest form utilizes three constraints: an initial location constraint; a relative motion constraint, which is the object's path; and a relative measurement constraint, which is one or more measurements of an object to a landmark.

The initial motion constraint is the initial pose (e.g., position and orientation) of the vehicle, which consists of the vehicle's position in two or three dimensional space including pitch, roll, and yaw data. The relative motion constraint is the displaced motion of the object which contains a degree of flexibility to accommodate map consistency. The relative measurement constraint includes one or more measurements from the object sensors to a landmark. The initial location constraint, the relative motion constraint, and the relative measurement constraint are typically Gaussian probability distributions. Object locating methods within a sensor-generated map typically employ Kalman filters, various statistical correlation methods such as the Pearson product-moment correlation, and/or particle filters.

In some embodiments, once a map is built, vehicle localization is achieved in real time via a particle filter. Particle filters, unlike Bayes or Kalman filters, accommodate non-linear systems. To locate a vehicle, particles are generated around an expected mean value via a Gaussian probability distribution. Each particle is assigned a numerical weight representing the accuracy of the particle position to the predicted position. Sensor data is taken into account and the particle weights are adjusted to accommodate the sensor data. The closer the proximity of the particle to the sensor adjusted position, the greater the numerical value of the particle weights.

As an action command occurs, each particle is updated to a new predicted position. Sensor data is observed at the new predicted position and each particle is assigned a new weight representing the accuracy of the particle position with respect to the predicted position and sensor data. The particles are re-sampled, selecting the weights that have the most numerical magnitude, thus increasing the accuracy of the predicted and sensor-corrected object position. Typically the mean, variance, and standard deviation of the resampled data provides the new object position likelihood.

Particle filter processing is expressed as:

$$P(H_t|H_{t-1}, A_t, D_t) \quad \text{Equation 1}$$

where $H_t$ is the current hypothesis, which is the object position. $H_{t-1}$ is the previous object position, $A_t$ is the action, which is typically a motor command, and $D_t$ is the observable data.

In some embodiments, the localization and mapping module 40 maintains an estimate of the vehicle's global position by incorporating data from multiple sources as discussed above in an Extended Kalman Filter (EKF) framework. Kalman filters are linear filters based on Recursive Bayesian Filters. Recursive Bayesian Filters, also referred to as Recursive Bayesian Estimation, essentially substitute the posterior of an estimation into the prior position to calculate a new posterior on a new estimation iteration. This effectively yields:

$$P(H_t|H_{t-1}, D_t) \quad \text{Equation 2}$$

where the probability of a hypothesis $H_t$ is estimated by the hypothesis at the previous iteration $H_{t-1}$ and the data $D_t$ at current time t.

A Kalman filter adds an action variable $A_t$ where t is a time iteration, yielding:

$$P(H_t|H_{t-1}, A_t, D_t) \quad \text{Equation 3}$$

where the probability of a hypothesis $H_t$ is based on the previous hypothesis $H_{t-1}$, an action $A_t$, and data $D_t$ at current time t.

Used extensively in robotics, a Kalman filter estimates a current position, which is a joint probability distribution, and based on an action command predicts a new position which is also a joint probability distribution, called a state prediction. Sensor data is acquired and a separated joint probability distribution is calculated, called a sensor prediction.

State prediction is expressed as:

$$X'_t = AX_{t-1} + B\mu + \varepsilon_t \quad \text{Equation 4}$$

where $X'_t$ is a new state based on the previous state $AX_{t-1}$, $B\mu$ and $\xi_t$. Constants A and B are defined by the physics of interest, $\mu$ is typically a robotic motor command, and $\xi_t$ is a Gaussian state error prediction.

Sensor prediction is expressed as:

$$Z'_t = CX_t + \varepsilon_z \quad \text{Equation 5}$$

where $Z'_t$ is the new sensor estimate, C is a function and $\xi_z$ is a Gaussian sensor error prediction.

A new predicted state estimate is expressed as:

$$X_{EST} = X'_t + K(Z_t - Z'_t) \quad \text{Equation 6}$$

where the product $K(Z_t - Z'_t)$ is referred to as the Kalman gain factor. If the difference between the sensor prediction $Z'_t$ and the actual sensor data $Z_t$ (that is, $Z_t - Z'_t$) is reasonably close to zero, then $X'_t$ is considered to be the new state estimate. If $Z_t - Z'_t$ is reasonably larger than zero, the $K(Z_t - Z'_t)$ factor is added to yield a new state estimate.

As vehicle movement information is received, the EKF updates the vehicle position estimate while also expanding the estimate covariance. Once the sensor covariance is integrated into the EKF, the localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading, velocity, and distance information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Bayesian models may be used in some embodiments to predict driver or pedestrian intent based on semantic information, previous trajectory, and instantaneous pose, where pose is the combination of the position and orientation of an object.

Commonly used in robotics, Bayes' Theorem, also referred to as a Bayesian filter, is a form of conditional probability. Bayes' Theorem, shown below in Equation 7, sets forth the proposition that the probability of a hypothesis H, given data D, is equal to the probability of a hypothesis H times the likelihood of the data D given the hypothesis H, divided by the probability of the data P(D).

$$P(H|D) = \frac{P(H)P(D|H)}{P(D)} \quad \text{Equation 7}$$

P(H/D) is referred to as the posterior and P(H) is referred to as the prior. Bayes' Theorem measures a probabilistic degree of belief in a proposition before (the prior) and after (the posterior) accounting for evidence embodied in the data, D. Bayes' Theorem is commonly used recursively when iterated. On each new iteration, the previous posterior becomes the prior to produce a new posterior until the iteration is complete. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. A live expert or advisor, e.g. the advisor 86 illustrated in FIG. 1, can optionally review the object prediction output 39 and provide additional input and/or override automatic driving operations and assume operation of the vehicle if desired or required by a vehicle situation. The interpretation module 48 generates an interpreted output 49 that includes additional input provided by the live expert, if any.

A path planning module 50 processes and synthesizes the object prediction output 39, the interpreted output 49, and additional routing information 79 received from an online database or live expert of the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 uses pose-graph optimization techniques, including non-linear least square pose-graph optimization, to optimize the map of car vehicle trajectories in six degrees of freedom and reduce path errors. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

Figure 3:
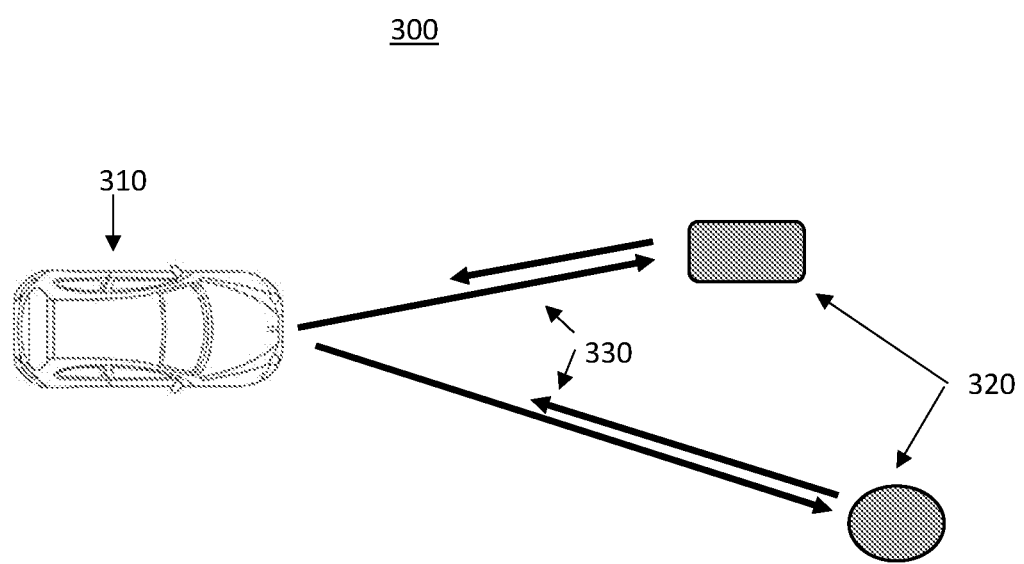
FIG. 3 is a diagram showing an exemplary environment for implementing the present disclosed systems and methods.

Turning now to FIG. 3, an exemplary environment 300 for implementing the present disclosed systems and methods is shown. In the illustrative example, a vehicle 310 is traveling with an operational LIDAR system. The system has a transmitter which is operative to transmit pulsed light or lasers 330 away from the vehicle 310. Some of the pulsed light is incident on objects 320 around the vehicle and a reflected signal is returned to a receiver on the vehicle. The vehicle is also equipped with a processor to process the returned signal to measure amplitude, propagation time and phase shift among other characteristics, in order to determine the distance to the objects 320, as well as size and velocity of the objects 320.

Figure 4:
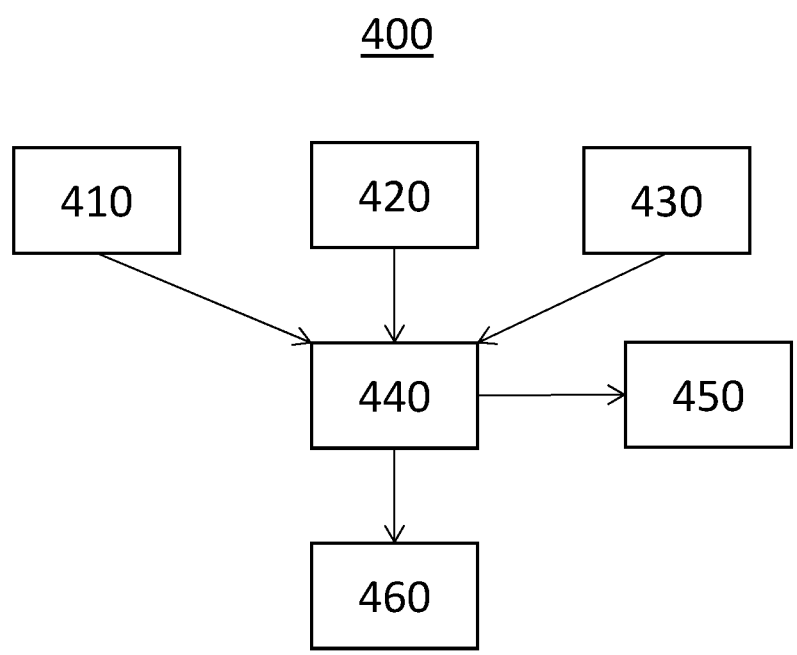
FIG. 4 is a block diagram illustrating an exemplary implementation of an apparatus for LIDAR implementation in a vehicle.

Turning now to FIG. 4, a functional block diagram of a LIDAR system 400 according to an exemplary method and system is shown. LIDAR transceiver 410 is operative to generate a laser beam, transmit the laser beam and capture the laser energy scattered/reflected from an object within the FOV. Scanner 420 moves laser beam across the target areas, Position Orientation System (POS) measures sensor position and orientation 430, system processor 440 controls all above actions, vehicle control system and user interface 450, data storage 460.

The LIDAR transceiver 410 is operative to generate a laser beam, transmit the laser beam into the FOV and capture energy reflected from a target. LIDAR sensors employ time-of-flight to determine the distance of objects from which the pulsed laser beams are reflected. The oscillating light signal is reflected off of the object and is detected by the detector within the LIDAR transceiver 410 with a phase shift that depends on the distance that the object is from the sensor. An electronic phase lock loop (PLL) may be used to extract the phase shift from the signal and that phase shift is translated to a distance by known techniques. The detector may also employ peak detection.

The scanner 420 is used to move the laser beam across the FOV. In one exemplary application, a rotational mirror is used to reflect a stationary laser across the FOV. In another exemplary application, a number of fixed lasers are pulsed in different directions in order to generate a FOV object model.

A POS 430 is used to accurately determine the time, position and orientation of the scanner 420 when a laser is pulsed. The system may include a GPS sensor, inertial measurement system, and other sensors. The POS may further be operative to determine the range measurement, scan angle, sensor position, sensor orientation and signal amplitude. The data generated by the POS 430 may be combined with data generated by the LIDAR transceiver 410 in order generate a FOV object model.

The system processor 440 is operative to transmit control signals to the LiDAR transceiver 410, the POS 430 and the scanner 420 and to receive data from these devices. The system processor 240 receives the data and determines the location of objects within the FOV, and may determine other information such as velocity of objects, composition of objects, signal filtering, etc. The memory 460 is operative to store digital representations of returned signal pulses, and/or to store data calculated by the system processor 440. The vehicle control system/user interface 450 is operative to receive inputs from a user, to display results if required, and optionally, to generate vehicle control signals in response to the data generated by the system processor 440. Vehicle control signals may be used to control an autonomous vehicle, may be used for collision avoidance, or may be used for a driver warning system, among other uses.

Figure 5:
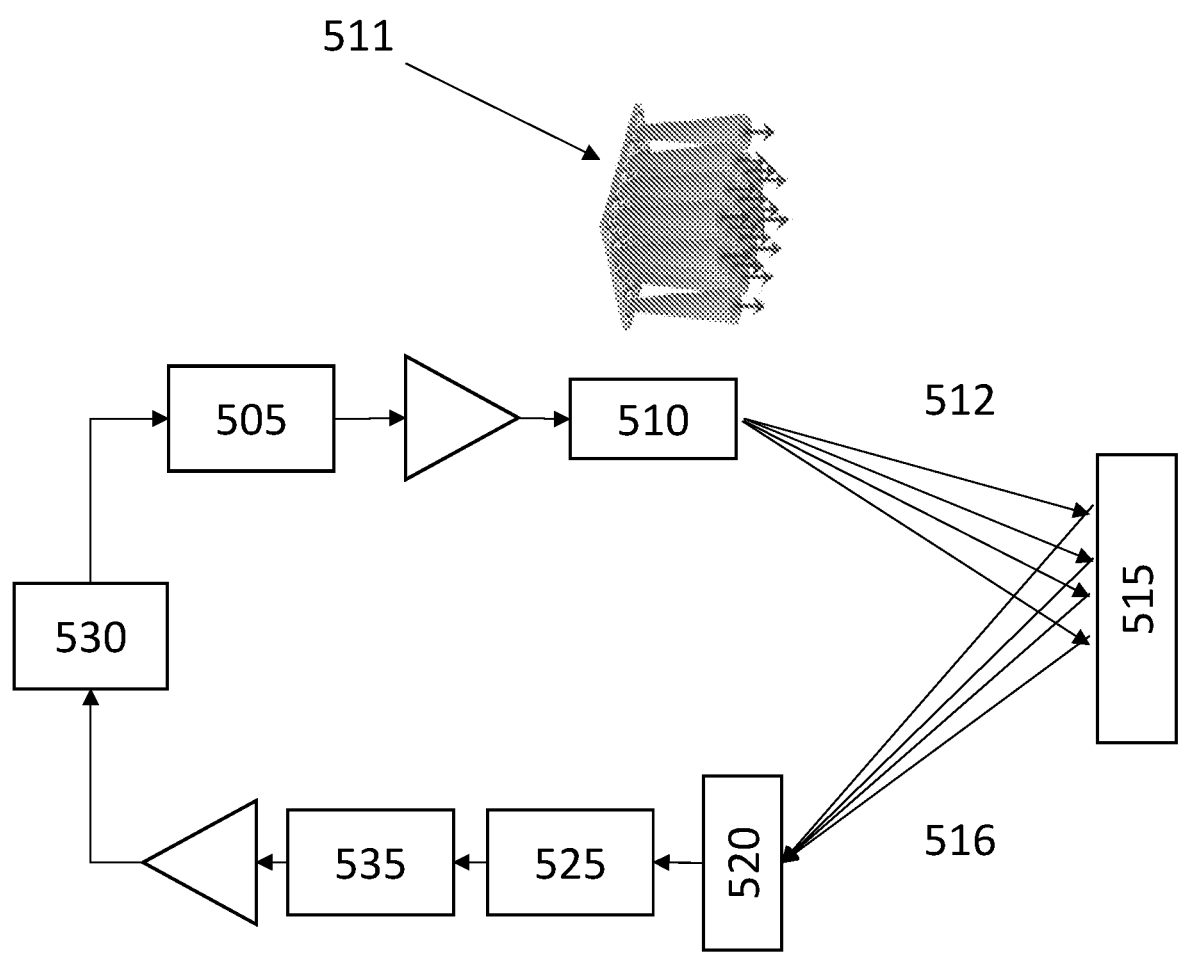
FIG. 5 is a block diagram illustrating an exemplary implementation of a method for LIDAR implementation in a vehicle.

FIG. 5 is a block diagram of an array LiDAR system 500 according to embodiments. An array LiDAR 510 includes an array of lasers 511. Each laser 511 may be a vertical-cavity surface-emitting laser (VCSEL). A VCSEL is a semiconductor-based laser diode that emits an optical beam vertically from its top surface, as shown. The laser beam 512 emitted by each laser 511 (e.g., VCSEL) forms a field-of-view. Any object 515 within the field of view of the array LiDAR 510 result in reflections 516 that are received at a bandpass filter (BPF) 520. The reflections 516 in the field of view of the receive side of the array LiDAR system 500 are filtered by the BPF 520 and focused through a lens 525 to an avalanche photodiode (APD) 535 that converts the received and filtered light into an electrical signal. This electrical signal is provided to a processing system 530. The processing system 530 may generate the signal ultimately emitted as laser beams 512. The generated signal may pass through an amplitude modulator 505 before reaching the array LiDAR 510.

The exemplary LiDAR system 500 is operative to transmit light pulses at a known pulse duration and a known pulse repetition rate and to receive light pulses resulting from the transmitted pulse reflection from an object with the path of the transmitted laser pulse. A typical pulse duration may be 10 nsec where a typical pulse repetition rate may be 140 kHz. A longer pulse duration may result in a lower SNR The transmitter 510 is operative to transmit a sequence of laser pulses in a known direction. The transmitter may include a laser diode for generating a laser, a wavelength modulator, a pulse width modulator, a frequency modulator, and/or an amplifier. The transmitter is operative to scan the laser pulses over a desired field of view over a period of time.

Receiver 530 is operative to receive the pulsed laser signals after they are reflected from objects within the FOV. The receiver may include amplifiers, mixers, circulators and the like in order to convert the received pulsed laser signal into an intermediate frequency (IF) signal that can be a manipulated by the processor 540. The receiver 530 may also be further operational to convert the received pulsed laser signals into digital representations. These digital representations may represent the received pulsed laser signal or the converted IF signal.

Processor 540 is operative to generate control signals which control the receiver 530 and the transmitter 510. These control signals may be operable to control the pulse rate of the laser pulse and the pulse width of the pulse. In addition, the control signals may control the receiver 530 such that the receiver 530 is operative to receive reflected pulsed laser signals at differing pulse rates and pulse widths. In an exemplary embodiment, the processor generates a control signal such that the transmitter 510 transmits a laser pulse with a known pulse duration. Thus, the laser is transmitted for a known amount of time for each pulse. The processor 540 further generates a control signal such that the receiver 530 is operative to receive a reflected representation of the laser pulse, and determines or records the pulse duration of the received laser pulse.

Once the data has been received from the transmitter 510 and/or the receiver 530, the processor 540 determines the distance to an object in response to the data representing the reflected representation of the laser. Furthermore, the processor 540 compares the duration of the transmitted laser pulse to the duration of the corresponding received data pulse. If the received laser pulse has a greater time duration that the transmitted laser pulse, then it can be assumed that the light pulse was incident on an inclined surface, as a LiDAR pulse will widen upon reflection from an inclined surface due to the increased propagation time of one portion of the light pulse. For example, at 60 m, a 0.5° beam creates λ=0.5 m distance spread at 45° surface. If g(t) is the shape of a pulse reflected from a perpendicular surface, then an inclined surface will produce the following waveform:

$$s(t) = \frac{1}{\Delta}\int_{-\Delta/2}^{\Delta/2} g\left(t - \frac{2x\tan\alpha}{c}\right)dx = \frac{1}{\Delta}\int_{-\Delta/2}^{\Delta/2}\sum_k \hat{g}_k \exp\left[2\pi jk\left(t - \frac{2x\tan\alpha}{c}\right)\right]dx$$

Figure 6:
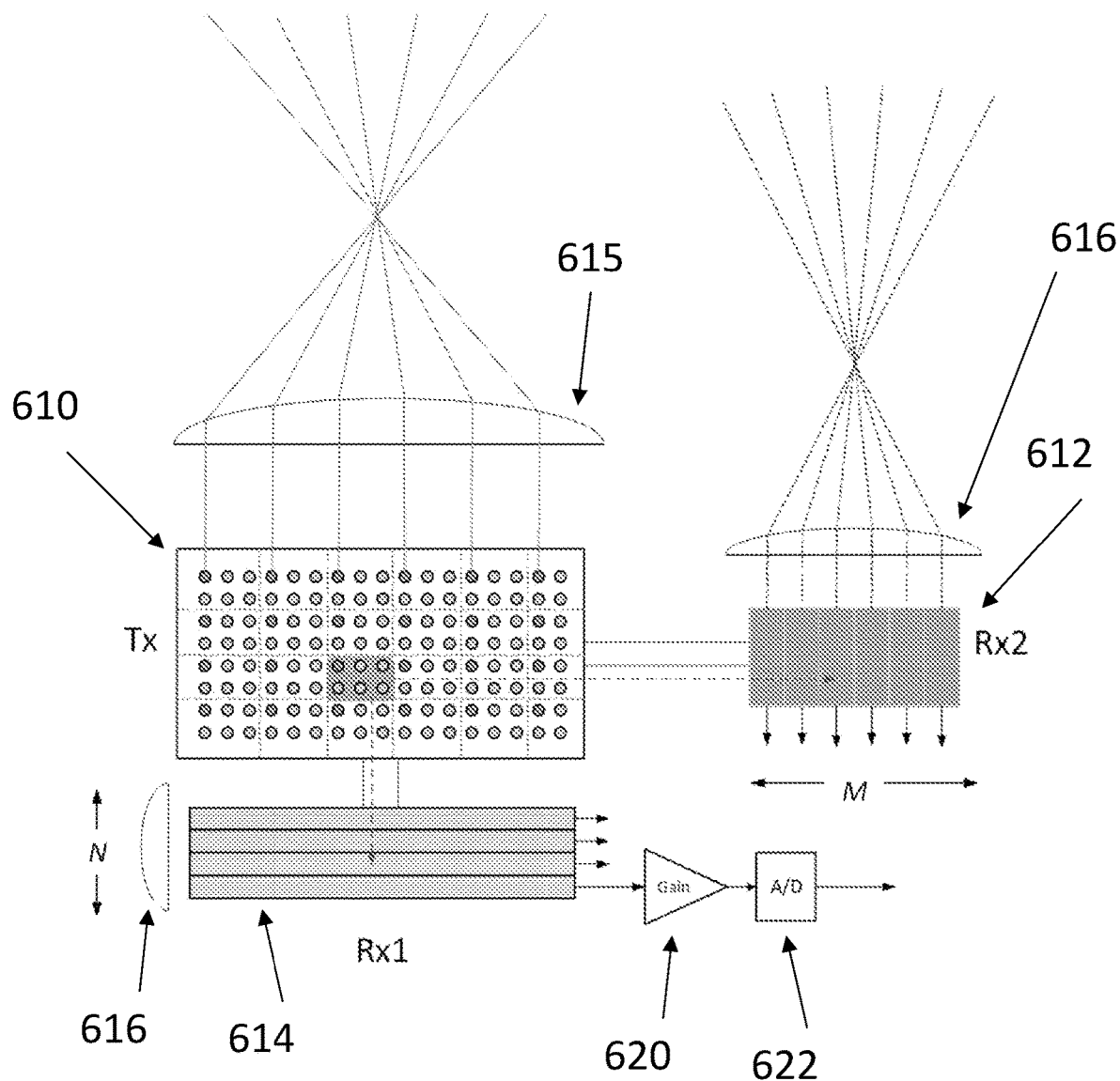
FIG. 6 shows an exemplary embodiments of a proposed VCSEL array for improved LiDAR scanning.

Turning now to FIG. 6, an exemplary embodiment of a proposed system of cross segmented detection 600 in a VCSEL array 610 for improved LiDAR scanning is shown. An array LiDAR 610 uses an array of lasers to illuminate a scene. The array LiDAR 610 is shown with the individual VCSEL arranged in a rectangular array. Each of the VCSEL have the same orientation on the substrate and a dispersing lens 615 is used to spread the laser beams across the field of view. Switching the individual lasers creates scanning of the scene.

The VCSEL array 610 is divided into M×N blocks in order to facilitate parallel acquisition and reduction of acquisition times. In this exemplary embodiment, the VCSEl array is divided into 3×2 segments. Each of the corresponding VCSEL in each segment are programmed to transmit simultaneously. Thus, in this example, the 1,1 VCSEL in each segments transmit simultaneously, followed by the 2,1 VCSEL in each segment, etc. Thus, all of the VCSELs in the array are transmitting at least every six transmission cycles. The proposed solution allows to speed up point cloud acquisition by operating several VCSELs in parallel. The considered scheme trades complication of Rx circuitry for faster acquisition/higher frame rate. Circuitry complication is linear in number of horizontal and vertical segments (M+N) while the speed-up is quadratic (M×N). This in contrast to TOF cameras, where for simultaneous acquisition of M×N points, M×N amplifying/sampling circuits are needed. Additional functionality of peak sorting must be implemented in the DSP domain One of the disadvantages to operating several VCSELs in parallel is the creation of angular ambiguities, since a simple detector produces no information as regarding the source of the detected signal. To address this disadvantage, the proposed system employs at least two segmented receivers 612, 614. A first receiver 612 has M vertical segments and a second receiver 614 with N horizontal segments. Transmit and receive optics ensure that pulses transmitted from block #(i,j) will be received in the i-th vertical segment and j-th horizontal segment. Received signals in each segment will contain pulses originating from different blocks. Pulse sorting is performed by cross-comparing digitized Rx traces from different segments. If a pulse falls across the edge of two segments, a partial power signal will be received by each segment. This ratio can be used to more accurately determine the transmitting VCSEL. Thus, by determining the ratio of pulse power in each of two or more horizontal segments and two or more vertical segments, the receiver processor can accurately determine the source of the pulse. Each of the segments is equipped with an amplifier 620 and an analog to digital converter 622. The amplified and digitized signal from each segment is then coupled to a processor, such as a digital signal processor.

Figure 7:
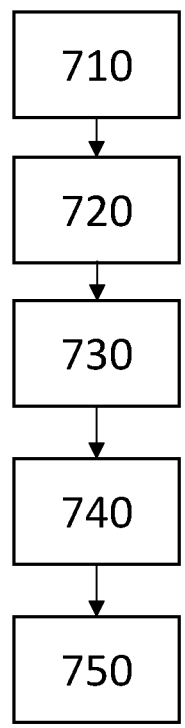
FIG. 7 shows a flowchart of a method for improved LiDAR scanning in accordance with an exemplary embodiment.

Turning now to FIG. 7, a flowchart 700 of a method for improved LiDAR scanning in accordance with an exemplary embodiment is shown. The method is operative to receive a first signal from a first detector representative of a first light pulse 710. In this exemplary embodiment, the first detector may have a plurality of vertical segments wherein the light pulse is dispersed across one or more of the vertical segments by a dispersing lens. The first signal may be a power signal received from one or more of the vertical segments, or the first signal may be digital signal from an analog to digital converter wherein the first signal is a digital representation of the amplitude or another parameter of the light pulse. The digital representation may further include a ratio in response to the light pulse detected by more than one of the vertical segments and an identification of the segments.

The method is then operative to receive a second signal from a second detector representative of a second light pulse 720. In this exemplary embodiment, the second detector may have a plurality of horizontal segments wherein the light pulse is dispersed across one or more of the horizontal segments by a dispersing lens. The second signal may be a power signal received from one or more of the horizontal segments, or the second signal may be digital signal from an analog to digital converter wherein the second signal is a digital representation of the amplitude or another parameter of the light pulse. The digital representation may further include a ratio in response to the light pulse detected by more than one of the horizontal segments and an identification of the segments.

The method is then operative to determine a segment of the first detector and a segment of the second detector 730. A data signal is received from each of the first receiver and the second receiver. The data signal may arrive from an A/D converter dedicated to a specific segment of a receiver, or the data signal may come from a multiplexer or the like with an indicator of the segment of origin. The data signal may further indicate more than one segment and/or a ratio of power or amplitude received at each segment.

The method is then operative to determine an origin of the light pulse in response to the segment of the first detector and the segment of the second detector 740. An algorithm is used to determine the origin VCSEL from the transmitter in response to the determination of the segment in the first detector and the segment in the second detector. For example, knowing the segment and the location of the segment relative to the diffusing lens facilitates calculation of the angle of incidence of the incoming light pulse. Alternatively, a lookup table may be used to determine the origin VCSEL from the determined segments.

The method is then operative to generate a control data in response to the first light pulse, the second light pulse and the determination of the origin 750. The control data may include the VCSEL of origin, the angle of incidence and the propagation time, or may be an obstacle map generated, in part, from the determined and calculated data.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links.

The invention claimed is:

1. An apparatus comprising:
a laser emitting device for emitting a laser in a first direction;
a first detector having a first detection portion for detecting a first laser intensity and a second detection portion for detecting a second laser intensity, wherein the first detection portion and the second detection portion are oriented in a first direction, the first detector further operative to generate a first control signal in response to the detection of the first laser intensity and the second laser intensity;
a second detector having a third detection portion for detecting a third laser intensity and a fourth detection portion for detecting a fourth laser intensity, wherein the third detection portion and the fourth detection portion are oriented in a second direction wherein the second direction is orthogonal to the first direction, the second detector further operative to generate a second control signal in response to the detection of the third laser intensity and the fourth laser intensity;
a first lens for distributing a first laser refection over a subsection of the first detection portion and the second detection portion;
a second lens for distributing a second laser reflection over a subsection of the third detection portion and the fourth detection portion; and
a processor for determining a transmitter of origin in response to the first control signal and the second control signal.

2. The apparatus of claim 1 wherein the first laser emitting device is a vertical cavity surface-emitting laser (VCSEL).

3. The apparatus of claim 1 wherein the apparatus is part of a LIDAR system.

4. The apparatus of claim 1 where the first laser reflection is a reflection of the laser from a target within a field of view.

5. The apparatus of claim 1 wherein the second detector has a fifth detection portion for detecting a fifth laser intensity and wherein the processor can further determine the transmitter of origin by determining a ratio of the third laser intensity, the fourth laser intensity and the fifth laser intensity.

6. The apparatus of claim 1 wherein the first lens defocuses the first laser reflection in order to distribute the first laser refection over a greater portion of the first detection portion and the second detection portion.

7. The apparatus of claim 1 wherein the laser emitting device, the first detector and the second detector have fixed orientations.

8. A LiDAR system comprising:
a transmitter for transmitting a light pulse;
a first detector having a first detection portion and a second detection portion, the first detection portion and the second detection portion having a first orientation;
a second detector having a third detection portion and a fourth detection portion, the third detection portion and the fourth detection portion having a second orientation, wherein the second orientation is orthogonal to the first orientation; and
a processor for determining a location of the transmitter in response to a first ratio of the light pulse detected by the first detection portion and the second detection portion and a second ratio of the light pulse detected by the third detection portion and the fourth detection portion.

9. The LiDAR system of claim 8 further comping a first lens for distributing the light pulse over the first detection portion and the second detection portion.

10. The LiDAR system of claim 8 wherein the transmitter is an array of vertical cavity surface emitting lasers.

11. The LiDAR system of claim 8 wherein the processor is further operative to determine a location of an object in response to the location of the transmitter, the first ratio and the second ratio.

12. The LiDAR system of claim 8 wherein the second detector has a fifth detection portion for detecting a fifth laser intensity and wherein the processor is further operative to determine the transmitter of origin by determining a ratio of the third laser intensity, the fourth laser intensity and the fifth laser intensity.

13. The LiDAR system of claim 8 further comprising a first lens for defocusing the light pulse in order to distribute the light pulse over a greater portion of the first detection portion and the second detection portion.

14. The LiDAR system of claim 8 wherein the transmitter, the first detector and the second detector have fixed orientations.

15. A vehicle sensor system comprising:
a VCSEL array having a first transmitter for transmitting a first light pulse and a second transmitter for transmitting a second light pulse;
a first detector array having a first vertical detector for receiving a first portion of the first light pulse and a second vertical detector for receiving a first portion of the second light pulse, the first detector further operative to generate a first control signal in response to the first portion of the first light pulse and the first portion of the second light pulse;
a second detector array having a first horizontal detector for receiving a second portion of the first light pulse and a second horizontal detector for receiving a second portion of the second light pulse, the second detector further operative to generate a second control signal in response to the second portion of the first light pulse and the second portion of the second light pulse; and
a processor for determining a location of an object in response to the first control signal and the second control signal.

16. The vehicle sensor system of claim 15 wherein the first light pulse and the second light pulse are transmitted simultaneously.

17. The vehicle sensor system of claim 15 where the object is within the field of view of the VCSEL array, the first detector and the second detector.

18. The vehicle sensor system of claim 15 further comprising a lens for dispersing the first light pulse and the second light pulse over the first detector and the second detector.

19. The vehicle sensor system of claim 15 further comprising a first lens for dispersing the first light pulse over the first detector and a second lens for dispersing the first light pulse over the second detector.

20. The vehicle sensor system of claim 15 further comprising a controller for controlling the vehicle in response to the determined location of the object.

* * * * *